United States Patent
Lee

(10) Patent No.: US 10,762,609 B2
(45) Date of Patent: Sep. 1, 2020

(54) DRIVING CIRCUIT OF PROCESSING HIGH DYNAMIC RANGE IMAGE SIGNAL AND DISPLAY DEVICE HAVING THE SAME

(71) Applicant: Samsung Display Co., Ltd., Yongin-si, Gyeonggi-do (KR)

(72) Inventor: Myungwoo Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 229 days.

(21) Appl. No.: 15/914,926

(22) Filed: Mar. 7, 2018

(65) Prior Publication Data

US 2019/0026872 A1   Jan. 24, 2019

(30) Foreign Application Priority Data

Jul. 21, 2017 (KR) .......................... 10-2017-0092962

(51) Int. Cl.

| H04N 9/69 | (2006.01) |
| G06T 5/00 | (2006.01) |
| G06T 11/60 | (2006.01) |
| H04N 1/64 | (2006.01) |
| H04N 9/67 | (2006.01) |
| H04N 9/68 | (2006.01) |

(Continued)

(52) U.S. Cl.
CPC .............. *G06T 5/009* (2013.01); *G06T 11/60* (2013.01); *G09G 3/2003* (2013.01); *G09G 3/3291* (2013.01); *H04N 1/6027* (2013.01); *H04N 1/646* (2013.01); *H04N 9/67* (2013.01); *H04N 9/68* (2013.01); *G06T 2207/20208* (2013.01); *G09G 2310/027* (2013.01); *G09G 2320/0673* (2013.01); *G09G 2360/16* (2013.01)

(58) Field of Classification Search
CPC ....... G06T 5/009; G06T 11/60; G09G 3/2003; G09G 3/3291; H04N 1/6027; H04N 1/646; H04N 9/67; H04N 9/68

See application file for complete search history.

(56) References Cited

U.S. PATENT DOCUMENTS 6,580,410 B1 * 6/2003 Nishimura ........... G09G 3/2011
                                                  345/690
6,801,178 B2 * 10/2004 Nitta ..................... G09G 3/2011
                                                  345/89

(Continued)

FOREIGN PATENT DOCUMENTS

KR   10-2017-0052287   5/2017

*Primary Examiner* — Gregory M Desire
(74) *Attorney, Agent, or Firm* — Lewis Roca Rothgerber Christie LLP

(57) ABSTRACT

A driving circuit configured to receive metadata and image signals, the driving circuit comprising: a meta-data parsing circuit configured to parse the metadata and output parsed metadata; an image analyzing and data processing circuit configured to analyze the image signals based on the parsed metadata and output a parameter and data signals; a reference voltage selector configured to output a reference voltage selection signal based on the parameter and the parsed metadata; a grayscale voltage generator configured to select a plurality of reference voltages in response to the reference voltage selection signal and generate a plurality of grayscale voltages based on the selected reference voltages; and an output circuit configured to convert the data signals to data voltage signals based on the grayscale voltages.

16 Claims, 8 Drawing Sheets

(51) Int. Cl.
*G09G 3/20* (2006.01)
*H04N 1/60* (2006.01)
*G09G 3/3291* (2016.01)

(56) References Cited

U.S. PATENT DOCUMENTS

| | | | |
|---|---|---|---|
| 8,203,572 B2* | 6/2012 | Park | G09G 3/2003 |
| | | | 345/589 |
| 9,129,445 B2 | 9/2015 | Mai et al. | |
| 9,613,407 B2 | 4/2017 | Atkins et al. | |
| 9,665,964 B2* | 5/2017 | Aiba | G09G 5/14 |
| 9,712,781 B2 | 7/2017 | Oh et al. | |
| 10,097,464 B1* | 10/2018 | Conlon | H04L 47/125 |
| 10,140,694 B2* | 11/2018 | Park | G09G 3/2092 |
| 2016/0005349 A1 | 1/2016 | Atkins et al. | |
| 2016/0241829 A1* | 8/2016 | Qu | H04N 21/4318 |
| 2019/0026872 A1* | 1/2019 | Lee | G06T 5/009 |

* cited by examiner

DRIVING CIRCUIT OF PROCESSING HIGH DYNAMIC RANGE IMAGE SIGNAL AND DISPLAY DEVICE HAVING THE SAME

CROSS-REFERENCE TO RELATED APPLICATION

The present patent application claims priority to and the benefit of Korean Patent Application No. 10-2017-0092962, filed on Jul. 21, 2017, the content of which is hereby incorporated by reference in its entirety.

BACKGROUND

1. Field

One or more aspects of example embodiments of the present disclosure relate to a driving circuit of processing a high dynamic range image signal and a display device having the driving circuit.

2. Description of the Related Art

It is known that human eyes are capable of perceiving a wide dynamic range of brightness of about $10^{-4} \sim 10^9$ nit (nit=$cd/m^2$) under a natural environment, and thus there is a growing interest in a high dynamic range (hereinafter, referred to as an "HDR") technology considering the perception characteristics.

However, the dynamic range of brightness that is able to be represented by a display device at present is far lower than the HDR image content. For instance, a peak brightness specification of an HDR image is about 10,000 nit, but the peak brightness able to be presented by the display device is about 1,000 nit.

Accordingly, in order to display the HDR image content having a wider brightness range than the brightness range able to be represented by the display device, an image processing algorithm that converts the HDR image contents to content appropriate for a narrow brightness range of the display device (e.g. a gamma characteristic of the display device), may be utilized for the display device. Especially, an image processing technology that reduces deterioration in image quality of the HDR image may be desired.

The above information discussed in this Background section is only for enhancement of understanding of the background of the described technology and therefore it may contain information that does not constitute prior art that is already known to a person having ordinary skill in the art.

SUMMARY

Aspects of some example embodiments of the present disclosure provide a driving circuit capable of reducing a deterioration in image quality of a high dynamic range image when the image is displayed.

Some example embodiments of the present invention include a display device having the driving circuit.

According to some example embodiments of the present invention, in a driving circuit configured to receive metadata and image signals, the driving circuit includes: a meta-data parsing circuit configured to parse the metadata and output parsed metadata; an image analyzing and data processing circuit configured to analyze the image signals based on the parsed metadata and output a parameter and data signals; a reference voltage selector configured to output a reference voltage selection signal based on the parameter and the parsed metadata; a grayscale voltage generator configured to select a plurality of reference voltages in response to the reference voltage selection signal and generate a plurality of grayscale voltages based on the selected reference voltages; and an output circuit configured to convert the data signals to data voltage signals based on the grayscale voltages.

According to some example embodiments, the reference voltage selector includes: an electro-optical transfer function (EOTF) circuit configured to calculate an EOTF based on the parsed metadata and output a first result value; a tone mapping unit configured to execute a brightness mapping operation based on the parsed metadata and the parameter and output a second result value; a gamut mapping unit configured to execute a gamut mapping operation based on the parsed metadata and output a third result value; and a reference voltage selector configured to output the reference voltage selection signal based on the first, second, and third result values.

According to some example embodiments, the grayscale voltage generator includes: a reference voltage generator configured to generate a plurality of voltages; a selection circuit configured to output plural voltages corresponding to the reference voltage selection signal among the voltages as the reference voltages; and a voltage generator configured to generate the grayscale voltages based on the reference voltages.

According to some example embodiments, the output circuit includes: a shift register configured to output latch clock signals in synchronization with a clock signal; a latch circuit configured to latch the data signals in synchronization with the latch clock signals; a digital-to-analog converter configured to convert the data signal output from the latch circuit to analog image signals based on the grayscale voltages; and an output buffer configured to output the analog image signals as the data voltage signals.

According to some example embodiments of the present invention, a display device includes: a display panel; and a driving circuit configured to receive image signals and metadata and convert the image signals to data voltage signals based on the metadata to provide the data voltage signals to the display panel, the driving circuit includes: a meta-data parsing circuit configured to parse the metadata and output the parsed metadata; an image analyzing and data processing circuit configured to analyze the image signals based on the parsed metadata and output a parameter and data signals; a reference voltage selector configured to output a reference voltage selection signal based on the parameter and the parsed metadata; a grayscale voltage generator configured to select a plurality of reference voltages in response to the reference voltage selection signal and generate a plurality of grayscale voltages based on the selected reference voltage; and an output circuit configured to convert the data signals to data voltage signals based on the grayscale voltages and provide the data voltage signals to the display panel.

According to some example embodiments, the display panel comprises a plurality of data lines, a plurality of gate lines, and a plurality of pixels each being connected to a corresponding data line among the data lines and a corresponding gate line among the gate lines.

According to some example embodiments, the driving circuit is a data driving circuit configured to apply the data voltage signals to the data lines.

According to some example embodiments, the display device further includes: a gate driving circuit configured to drive the gate lines; and a controller configured to control the gate driving circuit and the data driving circuit in response to a control signal provided from an outside of the controller.

According to some example embodiments, the reference voltage selector includes: an electro-optical transfer function (EOTF) circuit configured to calculate an EOTF based on the parsed metadata and outputs a first result value; a tone mapping unit configured to execute a brightness mapping operation based on the parsed metadata and the parameter and output a second result value; a gamut mapping unit configured to execute a gamut mapping operation based on the parsed metadata and output a third result value; and a reference voltage selector configured to output the reference voltage selection signal based on the first, second, and third result values.

According to some example embodiments, the grayscale voltage generator includes: a reference voltage generator configured to generate a plurality of voltages; a selection circuit configured to output plural voltages corresponding to the reference voltage selection signal among the voltages as the reference voltages; and a voltage generator configured to generate the grayscale voltages based on the reference voltages.

According to some example embodiments, the output circuit includes: a shift register configured to output latch clock signals in synchronization with a clock signal; a latch circuit configured to latch the data signals in synchronization with the latch clock signals; a digital-to-analog converter configured to convert the data signal output from the latch circuit to analog image signals based on the grayscale voltages; and an output buffer configured to output the analog image signals as the data voltage signals.

According to some example embodiments of the present invention, a display device includes: a display panel comprising a plurality of data lines, a plurality of gate lines, and a plurality of pixel each being connected to a corresponding data line among the data lines and a corresponding gate line among the gate lines; a timing controller configured to receive control signals, image signals, and metadata and output a first driving control signal, a second driving control signal, a reference voltage selection signal, and an image data signal; a grayscale voltage generator configured to select a plurality of reference voltages in response to the reference voltage selection signal and generate grayscale voltages based on the selected reference voltages; a data driving circuit configured to convert the image data signal to data voltage signals based on the first driving control signal and the grayscale voltages and provide the data voltage signals to the data lines; and a gate driving circuit configured to drive the gate lines in response to the second driving control signal, wherein the timing controller parses the metadata and output the reference voltage selection signal based on the parsed metadata.

According to some example embodiments, the timing controller includes: a meta-data parsing circuit configured to parse the metadata and output the parsed metadata; an image analyzing and data processing circuit configured to analyze the image signals based on the parsed metadata and output a parameter and data signals; and a reference voltage selector configured to output the reference voltage selection signal based on the parameter and the parsed metadata.

According to some example embodiments, the reference voltage selector includes: an electro-optical transfer function (EOTF) circuit configured to calculate an EOTF based on the parsed metadata and output a first result value; a tone mapping unit configured to execute a brightness mapping operation based on the parsed metadata and the parameter and output a second result value; a gamut mapping unit configured to execute a gamut mapping operation based on the parsed metadata and output a third result value; and a reference voltage selector configured to output the reference voltage selection signal based on the first, second, and third result values.

According to some example embodiments, the grayscale voltage generator includes: a reference voltage generator configured to generate a plurality of voltages; a selection circuit configured to output plural voltages corresponding to the reference voltage selection signal among the voltages as the reference voltages; and a voltage generator configured to generate the grayscale voltages based on the reference voltages.

According to some example embodiments, the output circuit includes: a shift register configured to output latch clock signals in synchronization with a clock signal; a latch circuit configured to latch the data signals in synchronization with the latch clock signals; a digital-to-analog converter configured to convert the data signals output from the latch circuit to analog image signals based on the grayscale voltages; and an output buffer configured to output the analog image signals as the data voltage signals.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Hereinafter, aspects of some example embodiments of the present invention will be explained in more detail with reference to the accompanying drawings.

Figure 1:
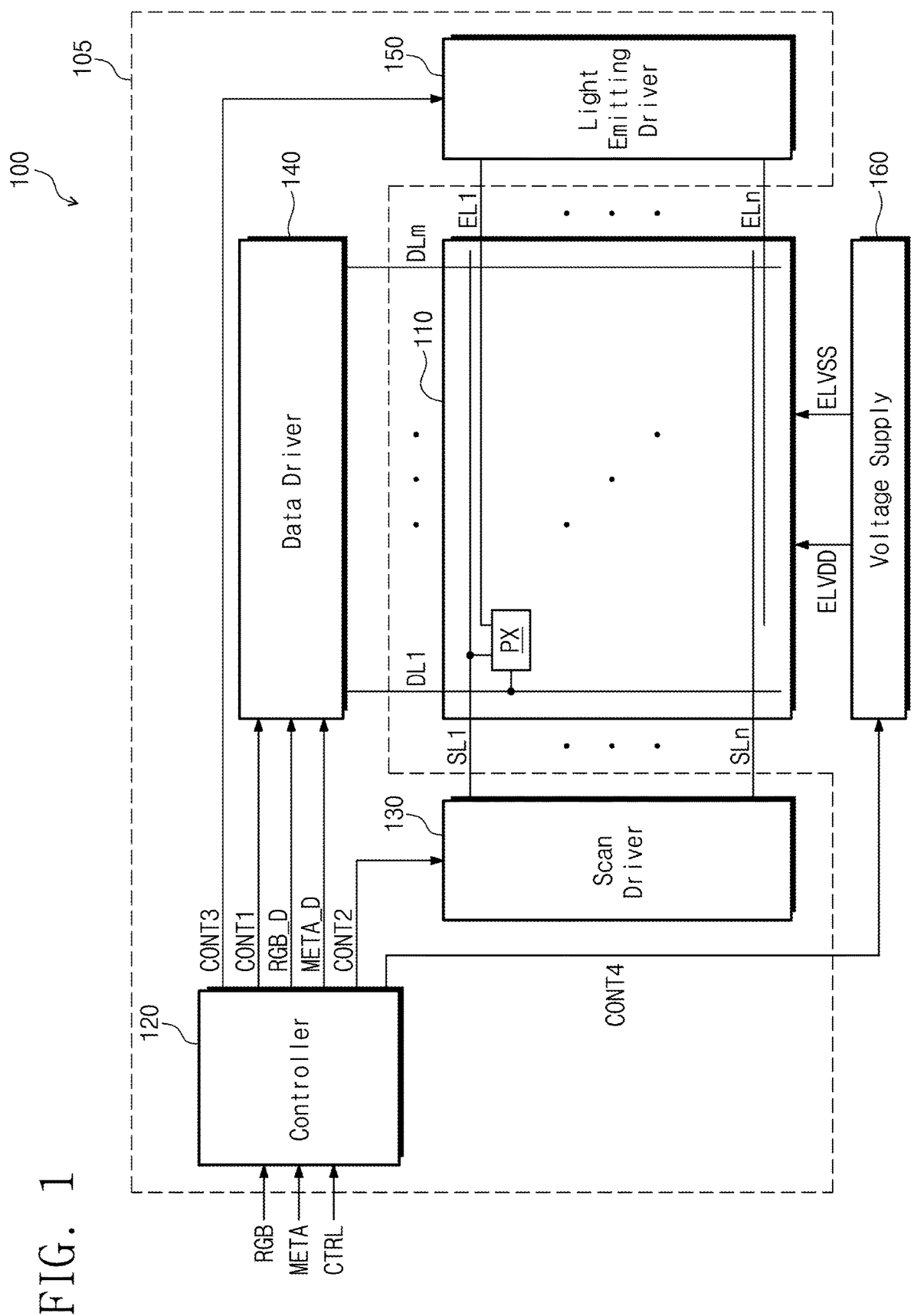
FIG. 1 is a block diagram showing a configuration of a display device according to some example embodiments of the present invention.

FIG. 1 is a block diagram showing a configuration of a display device 100 according to some example embodiments of the present invention.

Referring to FIG. 1, the display device 100 includes a display panel 110, a driving circuit 105, and a voltage supply 160. The driving circuit 105 includes a controller 120, a scan driver 130, a data driver 140, and a light emitting driver 150.

The controller 120, the scan driver 130, the data driver 140, and the light emitting driver 150 are connected to the display panel 110 in a chip-on-flexible printed circuit (COF) manner, a chip-on-glass (COG) manner, or a flexible printed circuit (FPC) manner.

The display panel 110 includes a plurality of data lines DL1 to DLm (m is a natural number equal to or greater than 2), a plurality of scan lines SL1 to SLn (n is a natural number equal to or greater than 2) arranged to cross the data lines DL1 to DLm, a plurality of light emitting control lines EL1 to ELn arranged substantially parallel to the scan lines SL1 to SLn, and a plurality of pixels PX arranged in areas defined by the data lines DL1 to DLm and the scan lines SL1 to SLn. The data lines DL1 to DLm, the scan lines SL1 to SLn, and the light emitting control lines EL1 to ELn are insulated from each other.

Although not shown in FIG. 1, each of the pixels PX includes a switching transistor connected to a corresponding data line, a corresponding scan line, and a corresponding light emitting line, a driving transistor, and an organic light emitting element.

The controller 120 receives image signals RGB, metadata META, and control signals CTRL from an external source. In the present example embodiment, the image signals RGB are high dynamic range image signals. The metadata META include high dynamic range information about the image signals RGB. For instance, the high dynamic range information may include at least one of minimum and maximum brightness information in each frame, backlight peak information including backlight unit brightness mapping parameter in each scene or frame, color specification information including gamut and color temperature of an image, a transfer parameter including a gamma correction parameter and a contrast enhancement control parameter, scene information including surrounding environment information of scene or frame timeline, histogram information representing lowest, highest, and mode pixel value information, sharpness information representing boundary area intensity information of the image, correlation information between scenes or frames, EOTF type information, and EOTF additional information. The EOTF type information may represent a type of EOTF that is used by a content manufacturer for optimal image quality of HDR contents.

Although multiple EOTF-related standards are established or the content manufacturer defines and uses arbitrary EOTF, when the EOTF type information is included in the metadata META, the display device 100 may distinguish the type of the used EOTF using the EOTF type information. The EOTF additional information is used to transfer additional information about the used EOTF when it is necessary to transfer additional information depending on the EOTF type information. In a case that it is necessary to transfer coefficients of multiple EOTF functions under various conditions with respect to given EOTF type information, a transmitter (e.g., a host device) may provide information about each coefficient using the EOTF additional information. For instance, in a case that the coefficient of appropriate EOTF function is changed depending on various maximum brightness conditions of the contents, all coefficients respectively corresponding to the maximum brightness conditions are required to be transferred. In this case, the EOTF additional information may be used by separately defining a field in the EOTF additional information to specify the number of maximum brightness conditions of the contents and representing target maximum brightness information and information about the coefficient of the EOTF function with respect to each maximum brightness condition.

The metadata META may be transferred from the host device every frame. According to another embodiment, in a case that metadata META of a previous frame are equal to metadata META of a present frame, the metadata META of the present frame may not be transferred to minimize an increase of bit rate.

The controller 120 generates first, second, third, and fourth driving control signals CONT1, CONT2, CONT3, and CONT4. The first driving control signal CONT1 is applied to the data driver 140, the second driving control signal CONT2 is applied to the scan driver 130, the third driving control signal CONT3 is applied to the light emitting driver 150, and the fourth driving control signal CONT4 is applied to the voltage supply 160. The first driving control signal CONT1 includes a start pulse signal, a sampling clock signal, a polarity control signal, and an output enable signal to control a drive of the data driver 140. The second driving control signal CONT2 includes a gate start pulse signal, a shift clock signal, and a gate output enable signal to control a drive of the scan driver 130.

The controller 120 provides image signals RGB_D and metadata META_D to the data driver 140. The image signals RGB_D and the metadata META_D may be substantially the same as the image signals RGB and the metadata META provided from the external source. According to another embodiment, the image signals RGB and the metadata META provided from the external source may be directly provided to the data driver 140 without passing through the controller 120.

The scan driver 130 may provide scan signals to the pixels PX, respectively, through the scan lines SL1 to SLn in response to the second driving control signal CONT2.

The data driver 140 may provide data voltages to the pixels PX, respectively, through the data lines DL1 to DLm in response to the first driving control signal CONT1.

The light emitting driver 150 may provide light emitting control signals to the pixels PX, respectively, through the light emitting control lines EL1 to ELn in response to the third driving control signal CONT3. The brightness of the display panel 110 may be controlled on the basis of the light emitting control signals.

The voltage supply 160 may provide a first power voltage ELVDD and a second power voltage ELVSS to the display panel 110 in response to the fourth driving control signal CONT4.

Figure 2:
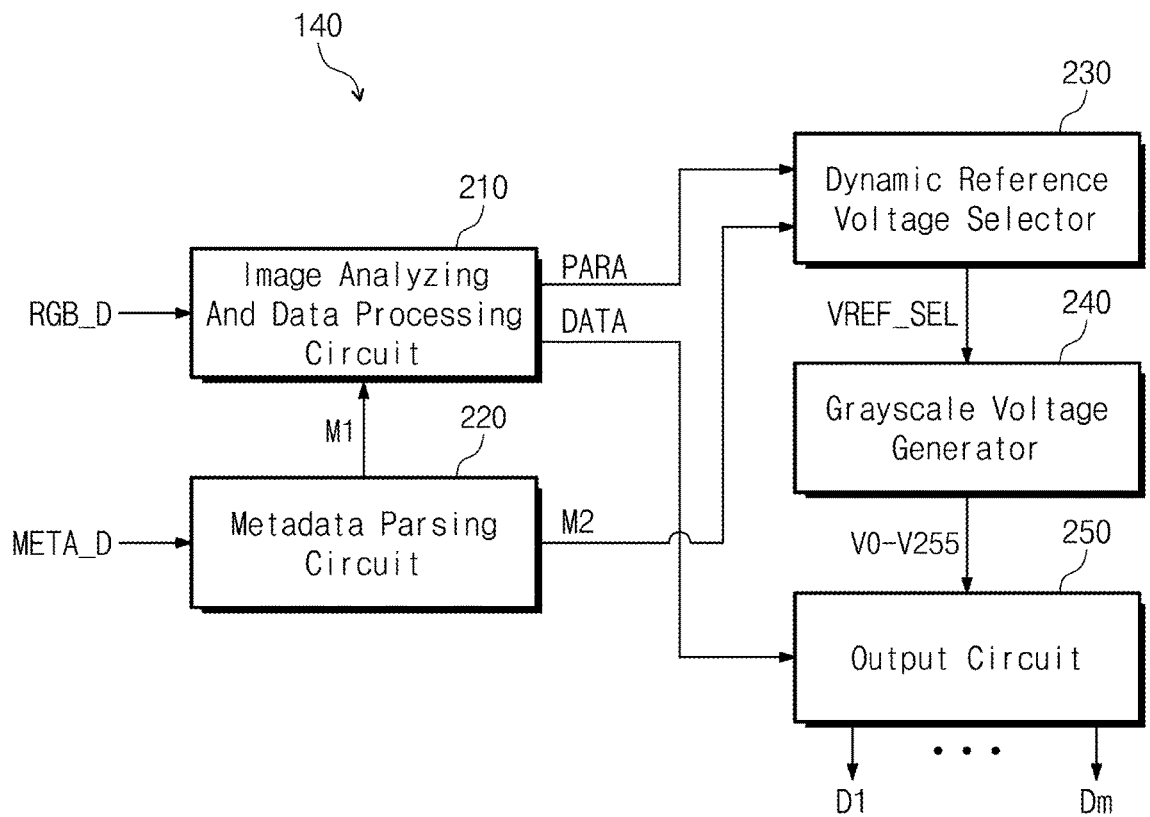
FIG. 2 is a block diagram showing a configuration of a data driver according to some example embodiments of the present invention.

FIG. 2 is a block diagram showing a configuration of the data driver 140 according to some example embodiments of the present invention.

Referring to FIG. 2, the data driver 140 includes an image analyzing and data processing circuit 210, a meta-data parsing circuit 220, a dynamic reference voltage selector 230, a grayscale voltage generator 240, and an output circuit 250.

The meta-data parsing circuit 220 parses the metadata META_D and outputs the parsed metadata M1 and M2. The parsing operation performed on the metadata META_D by the meta-data parsing circuit 220 may include a process of analyzing the metadata META_D including the high dynamic range information on the image signals RGB. The meta-data parsing circuit 220 outputs the parsed metadata M1 provided to the image analyzing and data processing circuit 210 and the parsed metadata M2 provided to the dynamic reference voltage selector 230 after analyzing the metadata META_D.

The image analyzing and data processing circuit 210 receives the image signals RGB_D and the parsed metadata M1. The image analyzing and data processing circuit 210 analyzes the image signals RGB_D based on the parsed metadata M1 and generates a parameter PARA used for a tone mapping operation of the dynamic reference voltage selector 230. The image analyzing and data processing circuit 210 converts the image signals RGB_D to an output image signal DATA. The image analyzing and data processing circuit 210 carries out image processing operations, such as reducing a power consumption, compensating for an image quality, compensating for deterioration, etc., to convert the image signals RGB_D to the output image signal DATA.

The dynamic reference voltage selector 230 receives the parameter PARA and the parsed metadata M2. The dynamic reference voltage selector 230 outputs a reference voltage selection signal VREF_SEL based on the parameter PARA and the parsed metadata M2. Details on configurations and operations of the dynamic reference voltage selector 230 will be described later.

The grayscale voltage generator 240 selects reference voltages in response to the reference voltage selection signal VREF_SEL and generates grayscale voltages V0 to V255 depending on the selected reference voltage.

The output circuit 250 receives the output image signal DATA from the image analyzing and data processing circuit 210 and the grayscale voltages V0 to V255 from the grayscale voltage generator 240. The output circuit 250 selects the grayscale voltage corresponding to the output image signal DATA among the grayscale voltages V0 to V255 and outputs the selected grayscale voltage as data voltage signals D1 to Dm. The data voltage signals D1 to Dm may be applied to the data lines DL1 to DLm shown in FIG. 1.

Figure 3:
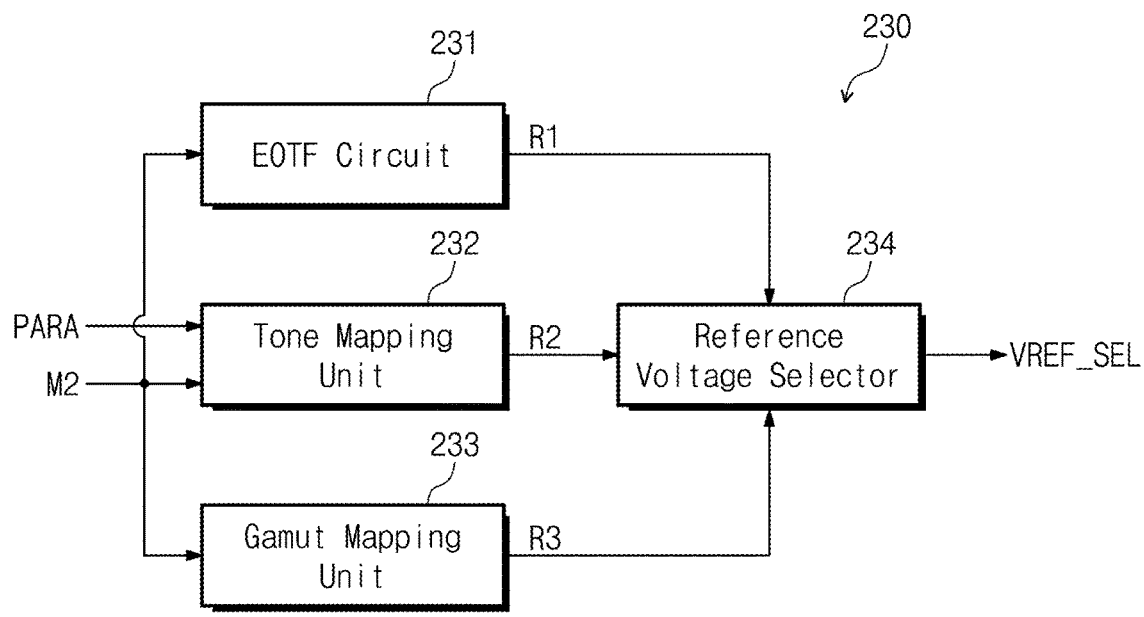
FIG. 3 is a block diagram showing a configuration of a dynamic reference voltage selector shown in FIG. 2.

FIG. 3 is a block diagram showing a configuration of the dynamic reference voltage selector 230 shown in FIG. 2.

Referring to FIG. 3, the dynamic reference voltage selector 230 includes an electro-optical transfer function (EOTF) circuit 231, a tone mapping unit 232, a gamut mapping unit 233, and a reference voltage selector 234.

The EOTF circuit 231 receives the parsed metadata M2 from the meta-data parsing circuit 220 shown in FIG. 2. The EOTF may be a function representing a relationship between the input image signal and the brightness (grayscale) of the output image. According to another embodiment, the EOTF may be a conversion function representing a relationship between the brightness (grayscale) of the input image and the output image signal. The EOTF circuit 231 calculates the EOTF based on the parsed metadata M2 and outputs a first result value R1.

The tone mapping unit 232 receives the parameter PARA from the image analyzing and data processing circuit 210 and the parsed metadata M2 from the meta-data parsing circuit 220. The maximum brightness of the image signals RGB provided from the host device (not shown) is about 10000 nit, but the maximum brightness displayed by the display panel 110 shown in FIG. 1 is about 1000 nit (or about 400 nit). Accordingly, a high grayscale aggregating phenomenon in which high grayscales exceeding about 1000 nit are saturated to the maximum brightness (e.g., about 1000 nit) of the display panel 110 may occur. In order to overcome a limitation in display of the display panel 110 shown in FIG. 1, the tone mapping unit 232 carries out a brightness mapping operation that increases a color contrast with respect to important values and decreases the color contrast with respect to non-important values based on brightness information, brightness range information, brightness range area ratio information, and the like, which are included in the parsed metadata M2, and outputs a second result value R2.

The gamut mapping unit 233 receives the parsed metadata M2 from the meta-data parsing circuit 220. The gamut mapping unit 233 outputs a third result value R3 to change a grayscale of each of a red signal, a green signal, and a blue signal of the output image with respect to the input image signal based on the parsed metadata M2.

The reference voltage selector 234 receives the first result value R1 from the EOTF circuit 231, the second result value R2 from the tone mapping unit 232, and the third result value R3 from the gamut mapping unit 233 and outputs the reference voltage selection signal VREF_SEL.

Figure 4:
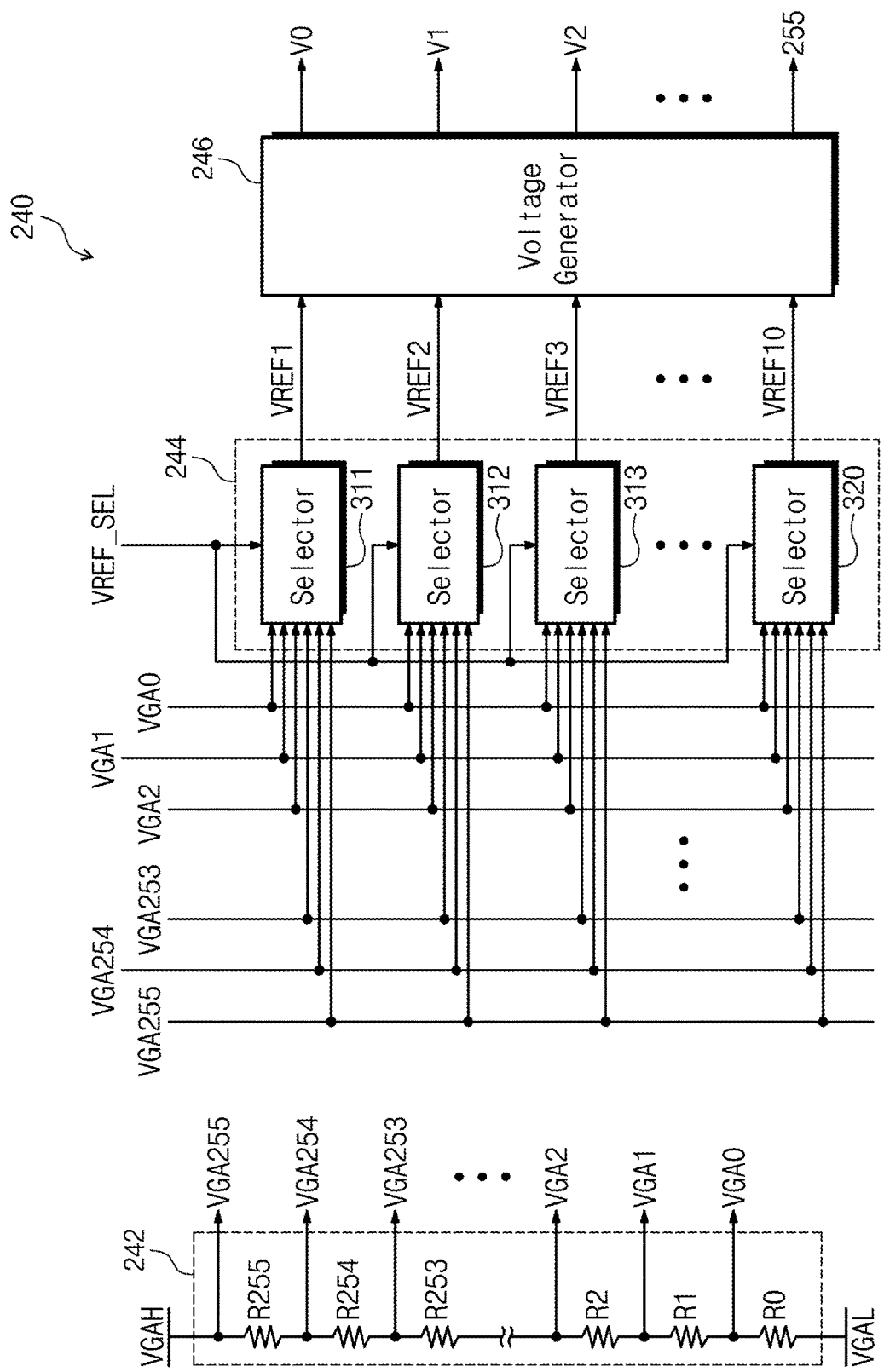
FIG. 4 is a view showing a configuration of a grayscale voltage generator shown in FIG. 2.

FIG. 4 is a view showing a configuration of the grayscale voltage generator 240 shown in FIG. 2.

Referring to FIG. 4, the grayscale voltage generator 240 includes a reference voltage generator 242, a selection circuit 244, and a voltage generator 246.

The reference voltage generator 242 receives a gamma high voltage VGAH and a gamma low voltage VGAL and outputs voltages VGA0 to VGA255. The reference voltage generator 242 includes resistors R0 to R255 sequentially connected to each other in series between the gamma low voltage VGAL and the gamma high voltage VGAH. Voltages of connection nodes between the resistors R0 to R255 are output as the voltages VGA0 to VGA255.

The selection circuit 244 includes selectors 311 to 320. Each of the selectors 311 to 320 selects one of the voltages VGA0 to VGA255 and outputs the selected voltage as one of reference voltages VREF1 to VREF10 in response to a reference voltage selection signal VREF_SEL.

For instance, the selectors 311 to 320 may output voltages VGA8, VGA33, VGA52, VGA71, VGA105, VGA130, VGA158, VGA180, VGA220, and VGA248 as the reference voltages VREF1 to VREF10, respectively.

The voltage generator 246 receives the reference voltages VREF1 to VREF10 and generates the grayscale voltages V0 to V255. The voltage generator 246 may generate a plurality of grayscale voltages between two reference voltages adjacent to each other by voltage division between the two reference voltages adjacent to each other. For instance, the voltage generator 246 generates the grayscale voltages V0 to V25 by the voltage division between the reference voltages VREF1 and VREF2 and generates the grayscale voltages V26 to V50 by the voltage division between the reference voltages VREF2 and VREF3. As described above, the voltage generator 246 may generate the grayscale voltages V0 to V255 using ten reference voltages VREF1 to VREF10. A voltage difference between the grayscale voltages V0 to V255 generated based on the reference voltages VREF1 to VREF10 and the number of the grayscale voltages generated by the two reference voltages adjacent to each other may be determined by a method preset in the voltage generator 246.

In the present example embodiment, the reference voltage generator 242 includes 256 resistors to output 256 voltages VGA0 to VGA255, however the number of the resistors and the number of the voltages may be changed without being limited to 256.

In the present example embodiment, the selection circuit 255 outputs ten voltages among the voltages VGA0 to VGA255 as the reference voltages VREF1 to VREF10, but the number of the reference voltages may be changed. As the number of the reference voltages increases, a distortion that occurs in conversion of the image signals RGB to the data voltage signals D1 to Dm may be minimized.

Figure 5:
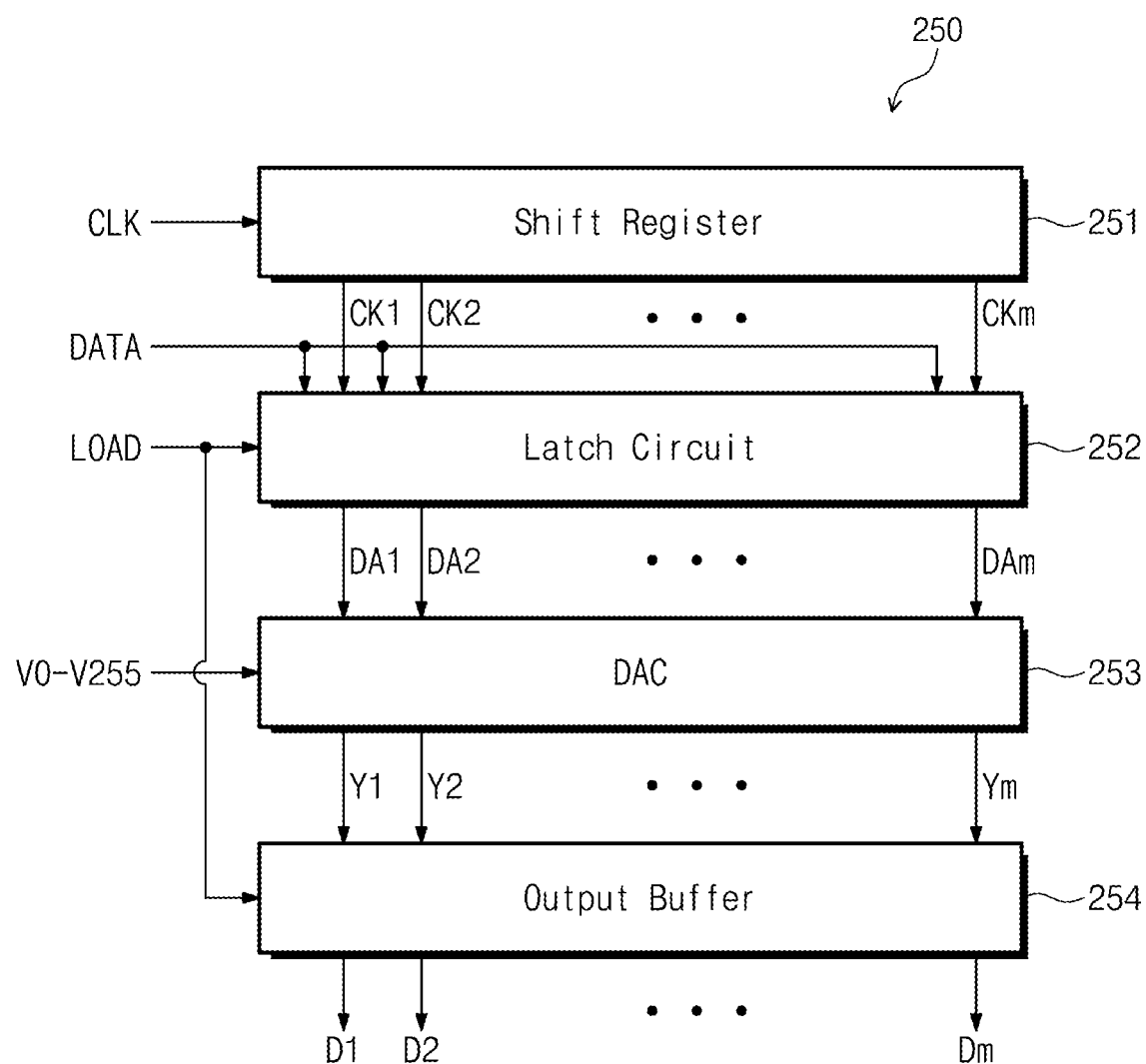
FIG. 5 is a block diagram showing a configuration of an output circuit shown in FIG. 2.

FIG. 5 is a block diagram showing a configuration of the output circuit 250 shown in FIG. 2.

Referring to FIG. 5, the output circuit 250 includes a shift register 251, a latch circuit 252, a digital-to-analog converter (DAC) 253, and an output buffer 254.

In FIG. 5, a clock signal CLK and a line latch signal LOAD are signals included in the first driving control signal CONT1 provided from the timing controller 120 shown in FIG. 1.

The shift register 251 sequentially activates latch clock signals CK1 to CKm in synchronization with the clock signal CK. The latch circuit 252 latches the output image signal DATA in synchronization with the latch clock signals CK1 to CKm from the shift register 251 and applies latch digital image signals DA1 to DAm to the DAC 253 in response to the line latch signal LOAD.

The DAC 253 receives the grayscale voltages V0 to V255 from the voltage generator 246 shown in FIG. 4 and outputs grayscale voltages respectively corresponding to the latch digital image signals DA to DAm from the latch circuit 252 to the output buffer 240 as analog image signals Y1 to Ym. The output buffer 254 receives the analog image signals Y1 to Ym from the DAC 253 and outputs the data voltage signals D1 to Dm to the data lines DL1 to DLm in response to the line latch signal LOAD.

Figure 6:
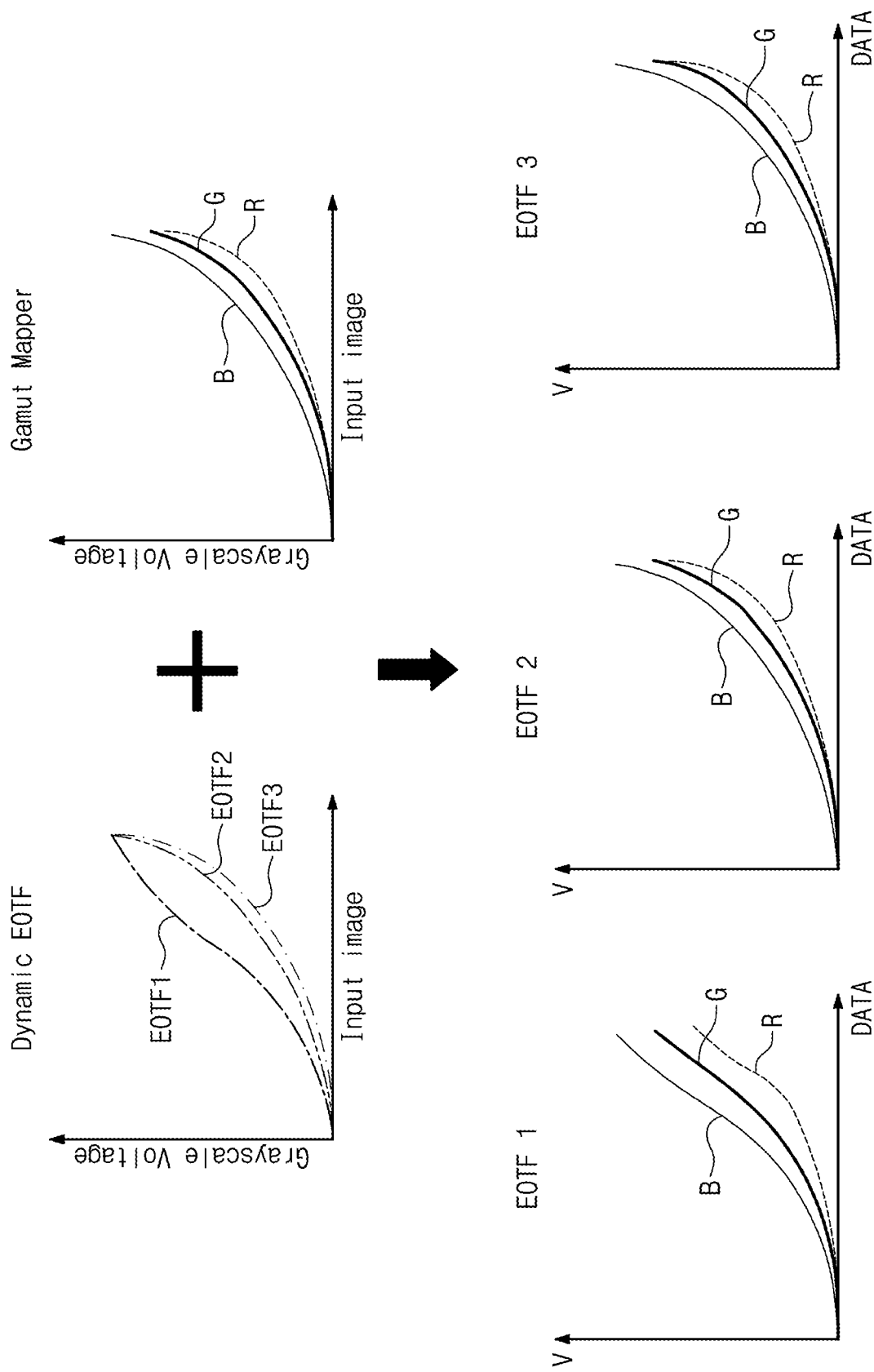
FIG. 6 is a view showing grayscale voltages of data signals output to the output circuit shown in FIG. 2 according to EOTF curves calculated by an EOTF circuit and mapping grayscale voltage curves determined by a gamut mapping unit.

FIG. 6 is a view showing grayscale voltages of data signals output to the output circuit shown in FIG. 2 according to EOTF curves calculated by an EOTF circuit and mapping grayscale voltage curves determined by a gamut mapping unit.

Referring to FIGS. 3 and 6, the EOTF circuit 231 calculates the EOTF based on the parsed metadata M2 and outputs the first result value R1. As shown in FIG. 6, the first result value R1 may be represented by an EOTF curve of the grayscale voltage with respect to the input image signal. In FIG. 6, the first result value R1 generated based on the parsed metadata M2 may be represented by various EOTF curves EOTF1, EOTF2, and EOTF3. The shape of the EOTF curve may be changed depending on characteristics of the input image signal and other parameter information included in the parsed metadata M2.

The gamut mapping unit 233 outputs the third result value R3 based on the parsed metadata M2 to change the grayscale of each of the red signal, the green signal, and the blue signal of the output image with respect to the input image signal. As shown in FIG. 6, the third result value R3 may be represented by a mapping grayscale voltage curve indicating the grayscale voltage with respect to the input image signal. The third result value R3 generated based on the parsed metadata M2 may be represented by various mapping grayscale voltage curves. In addition, as shown in FIG. 6, the third result value R3 may be represented by mapping grayscale voltage curves R, G, and B respectively corresponding to a red image signal, a green image signal, and a blue image signal.

The reference voltage selector 234 outputs the reference voltage selection signal VREF_SEL by combining the first result value R1 from the EOTF circuit 231, i.e., the EOTF curve, and the third result value R3 from the gamut mapping unit 233, i.e., the mapping grayscale voltage curve.

The selection circuit 244 shown in FIG. 4 selects some voltages of the voltages VGA0 to VGA255 in response to the reference voltage selection signal VREF_SEL and outputs the selected voltages as the reference voltages VREF1 to VREF10. The voltage generator 246 generates the grayscale voltages V0 to V255 in response to the reference voltages VREF1 to VREF10.

As shown in FIG. 6, voltage levels of the grayscale voltages V0 to V255 with respect to the output image signal DATA may be different from each other by the combination of the EOTF curves EOTF1 to EOTF3 and the mapping grayscale voltage curves R, G, and B.

As an example, when the first result value R1 from the EOTF circuit 231 has the shape of the EOTF curve EOTF1, the third result value R3 from the gamut mapping unit 233, i.e., the grayscale voltage V255 corresponding to each of the mapping grayscale voltage curves R, G, and B may have different voltage levels from each other.

For the convenience of explanation, FIG. 6 shows only the combination of the EOTF curve and the mapping grayscale voltage curve as a representative example, however, the reference voltage selector 230 shown in FIG. 3 may generate the reference voltage selection signal VREF_SEL by taking into account the second result value R2 from the tone mapping unit 232 in addition to the first result R1 from the EOTF circuit 231 and the third result value R3 from the gamut mapping unit 233.

As described above, the data driver 140 parses metadata M_D and selects the voltage level of the reference voltage based on the parsed metadata M2, and thus the data driver 140 may dynamically output the grayscale voltage level with respect to the image signal according to the metadata. Accordingly, the data driver 140 that receives the HDR image signal on which image processes, such as the EOTF, the tone mapping process, the color mapping process, etc., are not performed may provide the image signal to the data lines based on the reference voltages selected by the EOTF, the tone mapping process, and the color mapping process. The display device 100 changes the voltage level of the analog grayscale voltage after receiving the HDR image signal in which the data are not transformed, and thus instances of the image quality of the HDR image displayed in the display panel 110 being deteriorated may be prevented or reduced.

Figure 7:
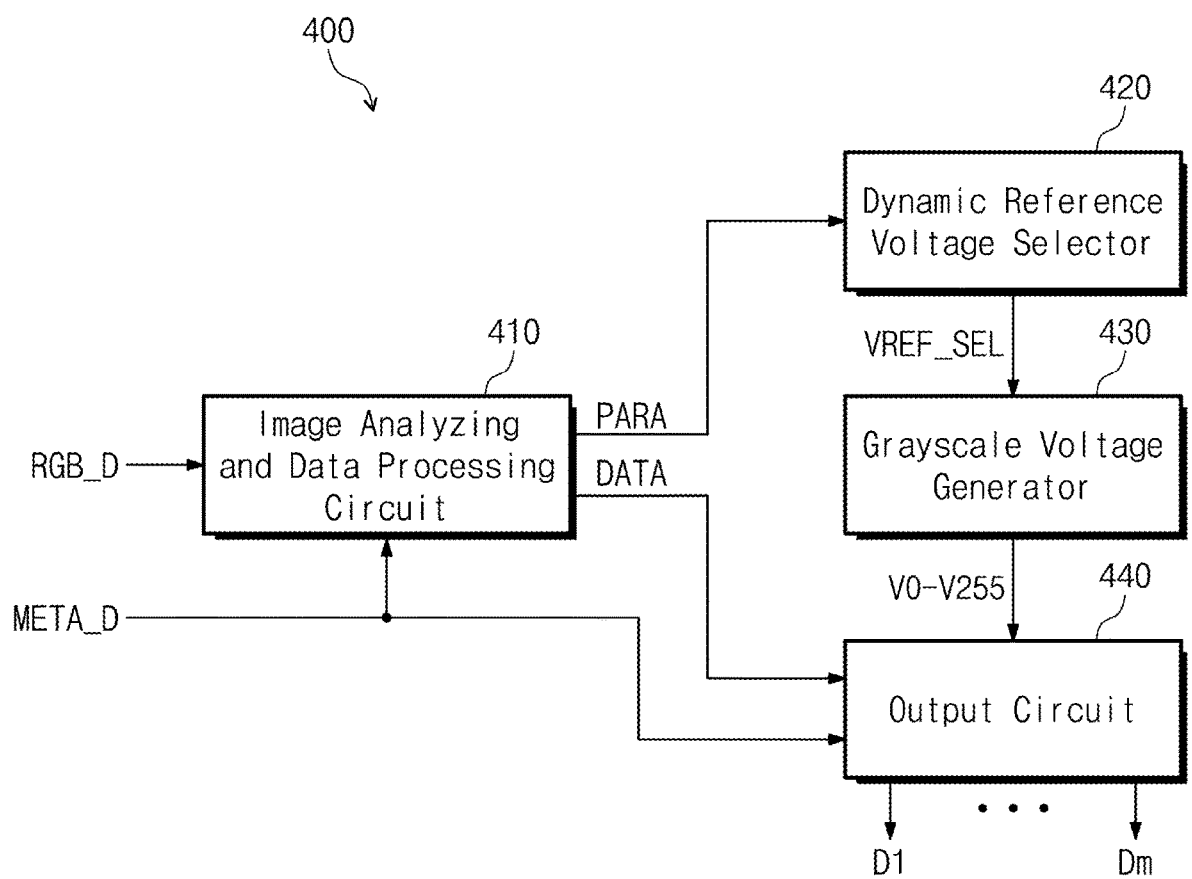
FIG. 7 is a block diagram showing a configuration of a data driver according to some example embodiments of the present invention.

FIG. 7 is a block diagram showing a configuration of a data driver 400 according to some example embodiments of the present invention.

Referring to FIG. 7, the data driver 400 includes an image analyzing and data processing circuit 410, a dynamic reference voltage selector 420, a grayscale voltage generator 430, and an output circuit 440.

The data driver 140 shown in FIG. 2 includes the metadata parsing circuit 220, but the data driver 400 shown in FIG. 7 does not include a meta-data parsing circuit.

Metadata META_D provided from a host (not shown) and applied to the data driver 400 shown in FIG. 7 through the controller 120 shown in FIG. 1 are the parsed data.

In a case that an external host device is an application processor (not shown) and the display device 100 shown in FIG. 1 is a mobile device, the application processor and the display device 100 may be connected to each other through a mobile industry processor interface (MIPI). In a case that the application processor and the display device 100 are connected to each other using an interface in which a transfer protocol for the metadata is not specified, the application processor may parse the metadata META and provide the parsed metadata to the display device 100.

The data driver 400 does not need to include the metadata parsing circuit because the data driver 400 receives the parsed metadata META_D. The image analyzing and data processing circuit 410, the dynamic reference voltage selector 420, the grayscale voltage generator 430, and the output circuit 440 of the data driver 400 have the same configuration and function as those of the image analyzing and data processing circuit 210, the dynamic reference voltage selector 230, the grayscale voltage generator 240, and the output circuit 250 shown in FIG. 2, and thus details thereof will be omitted.

Figure 8:
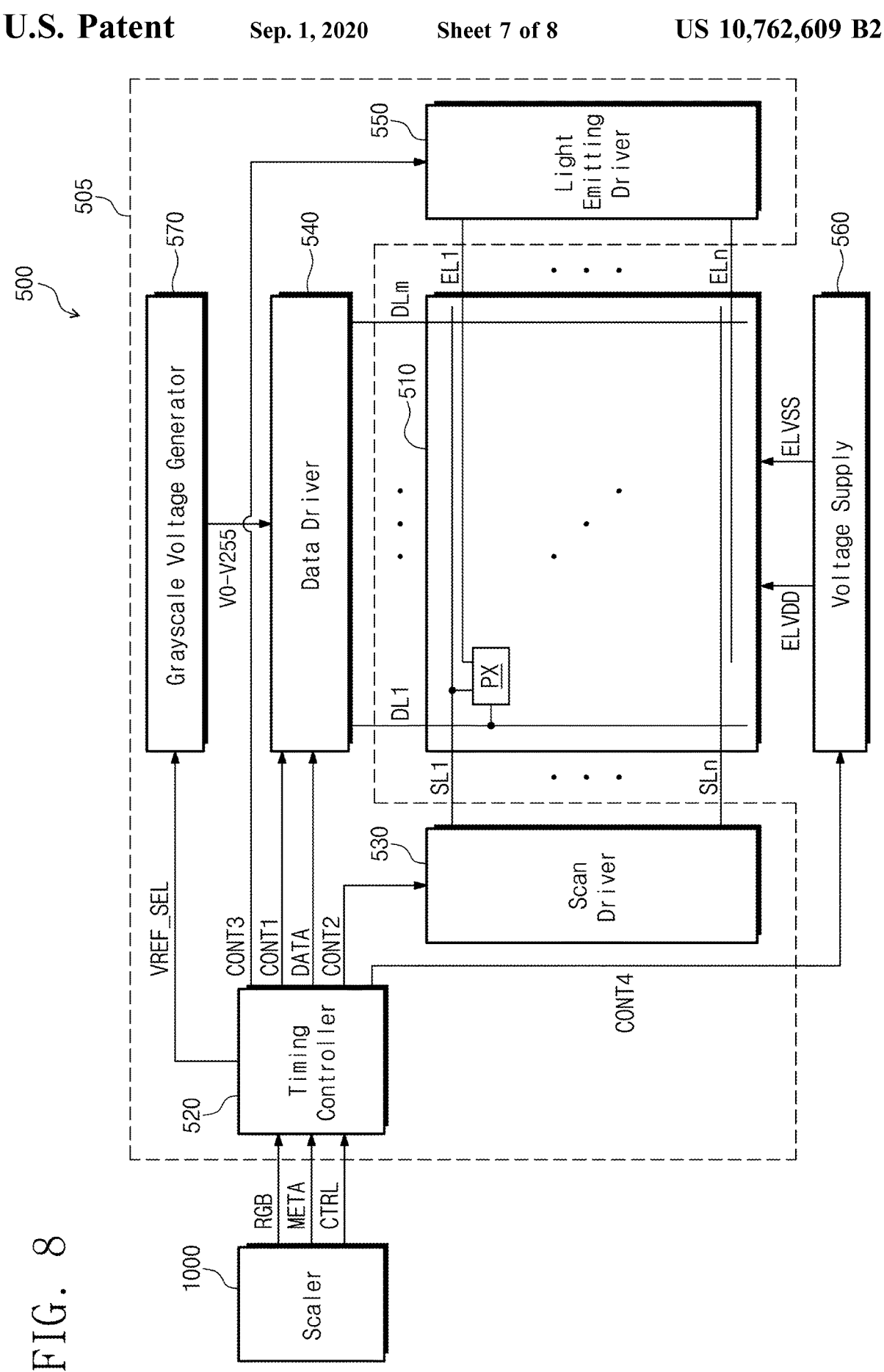
FIG. 8 is a block diagram showing a configuration of a display device according to some example embodiments of the present invention.

FIG. 8 is a block diagram showing a configuration of a display device 500 according to some example embodiments of the present invention.

Referring to FIG. 8, the display device 500 includes a display panel 510, a driving circuit 505, and a voltage supply 560. The driving circuit 505 includes a timing controller 520, a scan driver 530, a data driver 540, a light emitting driver 550, and a grayscale voltage generator 570.

A scaler 1000 may be a host device that provides image signals RGB, metadata META, and control signals CTRL. The image signals RGB, the metadata META, and the control signals CTRL, which are provided from the scaler 1000, are provided to the timing controller 520. The timing controller 520 generates first, second, third, and fourth driving control signals CONT1, CONT2, CONT3, and CONT4. The first driving control signal CONT1 is provided to the data driver 540, the second driving control signal CONT2 is provided to the scan driver 530, the third driving control signal CONT3 is provided to the light emitting driver 550, and the fourth driving control signal CONT4 is provided to the voltage supply 560. The timing controller 520 applies a reference voltage selection signal VREF_SEL to the grayscale voltage generator 570. The timing controller 520 converts the image signals RGB to data signals DATA based on the received metadata META. The data signals DATA are applied to the data driver 540.

The display panel 510, the scan driver 530, the light emitting driver 550, and the voltage supply 560 have the same configuration and function as those of the display panel 110, the scan driver 130, the light emitting driver 150, and the voltage supply 160 shown in FIG. 1, and thus details thereof will be omitted.

Figure 9:
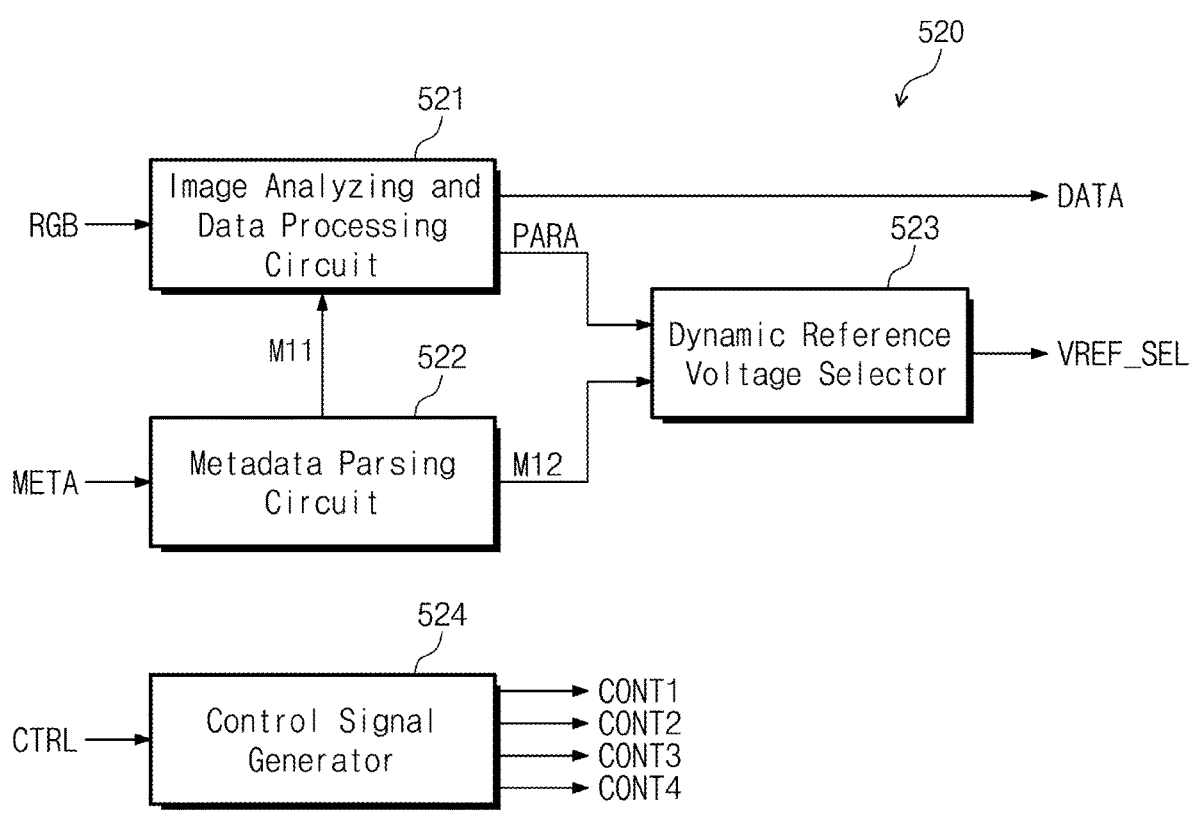
FIG. 9 is a block diagram showing a configuration of a timing controller shown in FIG. 8.

FIG. 9 is a block diagram showing a configuration of the timing controller 520 shown in FIG. 8.

Referring to FIG. 9, the timing controller 520 includes an image analyzing and data processing circuit 521, a meta-data parsing circuit 522, and a dynamic reference voltage selector 523.

The meta-data parsing circuit 522 parses metadata META and outputs parsed metadata M11 and M12.

The image analyzing and data processing circuit 521 receives the image signals RGB and the parsed metadata M11. The image analyzing and data processing circuit 521 analyzes the image signals RGB based on the parsed metadata M11 and generates a parameter PARA required to carry out a tone mapping operation of the dynamic reference voltage selector 523. The image analyzing and data processing circuit 521 converts the image signals RGB to the output image signal DATA. The image analyzing and data processing circuit 521 carries out image processing operations, such as reducing a power consumption, compensating for an image quality, compensating for deterioration, etc., to convert the image signals RGB to the output image signal DATA.

The dynamic reference voltage selector 523 receives the parameter PARA and the parsed metadata M12. The dynamic reference voltage selector 523 outputs a reference voltage selection signal VREF_SEL based on the parameter PARA and the parsed metadata M12. The dynamic reference voltage selector 523 may have the same circuit configuration as that of the dynamic reference voltage selector 230 shown in FIG. 3.

The control signal generator 524 receives the control signals CTRL and generates the first to fourth driving control signals CONT1 to CONT4.

Referring to FIG. 8 again, the grayscale voltage generator 570 selects plural reference voltages in response to the reference voltage selection signal VREF_SEL from the timing controller 520 and generates the grayscale voltages V0 to V255 based on the selected reference voltages. The grayscale voltage generator 570 may have the same circuit configuration as that of the grayscale voltage generator 240 shown in FIG. 4.

The data driver 540 receives the output image signal DATA from the timing controller 520 and the grayscale voltages V0 to V255 from the grayscale voltage generator 570. The data driver 540 selects grayscale voltages corresponding to the output image signal DATA among the grayscale voltages V0 to V255 and outputs the selected grayscale voltages as data signals. The data signals may be provided to the data lines DL1 to DLm. The data driver 540 may have the same circuit configuration as that of the output circuit 250 shown in FIG. 5.

According to the embodiments shown in FIGS. 1 to 4, the circuit that parses the metadata and selects the voltage level of the reference voltage based on the parsed metadata is included in the data driver 140. According to the embodiments shown in FIGS. 8 and 9, the circuit that parses the metadata and selects the voltage level of the reference voltage based on the parsed metadata is included in the timing controller 520.

The scaler 1000 provides the HDR image signal on which image processes, such as the EOTF, the tone mapping process, the color mapping process, etc., are not performed to the display device 500. The timing controller 520 of the display device 500 processes the EOTF, the tone mapping process, and the color mapping process based on the received metadata and selects the reference voltages. The grayscale voltage generator 570 generates the grayscale voltages V0 to V255 based on the selected reference voltages, and the data driver 540 converts the data signal DATA to the data voltage signals D1 to Dm based on the grayscale voltages V0 to V255 and provides the data voltage signals D1 to Dm to the data lines. The display device 500 changes the voltage level of the analog grayscale voltage after receiving the HDR image signal in which the data are not transformed, and thus instances of the image quality of the HDR image displayed in the display panel 510 being deteriorated may be prevented or reduced.

Although the example embodiments of the present invention have been described, it is understood that the present invention should not be limited to these example embodiments but various changes and modifications can be made by one ordinary skilled in the art within the spirit and scope of the present invention as defined by the following claims, and their equivalents.

What is claimed is:

1. A driving circuit configured to receive metadata and image signals, the driving circuit comprising:
    a meta-data parsing circuit configured to parse the metadata and output parsed metadata;
    an image analyzing and data processing circuit configured to analyze the image signals based on the parsed metadata and output a parameter and data signals;
    a reference voltage selector configured to output a reference voltage selection signal according to an electro-optical transfer function (EOTF), a brightness mapping operation, and a gamut mapping operation that are based on the parameter and the parsed metadata;

a grayscale voltage generator configured to select a plurality of reference voltages in response to the reference voltage selection signal and generate a plurality of grayscale voltages based on the selected reference voltages; and
an output circuit configured to convert the data signals to data voltage signals based on the grayscale voltages.

2. The driving circuit of claim 1, wherein the reference voltage selector comprises:
an EOTF circuit configured to calculate the EOTF based on the parsed metadata and output a first result value;
a tone mapping unit configured to execute the brightness mapping operation based on the parsed metadata and the parameter and output a second result value;
a gamut mapping unit configured to execute the gamut mapping operation based on the parsed metadata and output a third result value; and
a reference voltage selector configured to output the reference voltage selection signal based on the first, second, and third result values.

3. The driving circuit of claim 1, wherein the grayscale voltage generator comprises:
a reference voltage generator configured to generate a plurality of voltages;
a selection circuit configured to output plural voltages corresponding to the reference voltage selection signal among the voltages as the reference voltages; and
a voltage generator configured to generate the grayscale voltages based on the reference voltages.

4. The driving circuit of claim 1, wherein the output circuit comprises:
a shift register configured to output latch clock signals in synchronization with a clock signal;
a latch circuit configured to latch the data signals in synchronization with the latch clock signals;
a digital-to-analog converter configured to convert the data signal output from the latch circuit to analog image signals based on the grayscale voltages; and
an output buffer configured to output the analog image signals as the data voltage signals.

5. A display device comprising:
a display panel; and
a driving circuit configured to receive image signals and metadata and convert the image signals to data voltage signals based on the metadata to provide the data voltage signals to the display panel, the driving circuit comprising:
a meta-data parsing circuit configured to parse the metadata and output the parsed metadata;
an image analyzing and data processing circuit configured to analyze the image signals based on the parsed metadata and output a parameter and data signals;
a reference voltage selector configured to output a reference voltage selection signal according to an electro-optical transfer function (EOTF), a brightness mapping operation, and a gamut mapping operation that are based on the parameter and the parsed metadata;
a grayscale voltage generator configured to select a plurality of reference voltages in response to the reference voltage selection signal and generate a plurality of grayscale voltages based on the selected reference voltage; and
an output circuit configured to convert the data signals to data voltage signals based on the grayscale voltages and provide the data voltage signals to the display panel.

6. The display device of claim 5, wherein the display panel comprises a plurality of data lines, a plurality of gate lines, and a plurality of pixels each being connected to a corresponding data line among the data lines and a corresponding gate line among the gate lines.

7. The display device of claim 6, wherein the driving circuit is a data driving circuit configured to apply the data voltage signals to the data lines.

8. The display device of claim 7, further comprising:
a gate driving circuit configured to drive the gate lines; and
a controller configured to control the gate driving circuit and the data driving circuit in response to a control signal provided from an outside of the controller.

9. The display device of claim 5, wherein the reference voltage selector comprises:
an EOTF circuit configured to calculate the EOTF based on the parsed metadata and outputs a first result value;
a tone mapping unit configured to execute the brightness mapping operation based on the parsed metadata and the parameter and output a second result value;
a gamut mapping unit configured to execute the gamut mapping operation based on the parsed metadata and output a third result value; and
a reference voltage selector configured to output the reference voltage selection signal based on the first, second, and third result values.

10. The display device of claim 5, wherein the grayscale voltage generator comprises:
a reference voltage generator configured to generate a plurality of voltages;
a selection circuit configured to output plural voltages corresponding to the reference voltage selection signal among the voltages as the reference voltages; and
a voltage generator configured to generate the grayscale voltages based on the reference voltages.

11. The display device of claim 5, wherein the output circuit comprises:
a shift register configured to output latch clock signals in synchronization with a clock signal;
a latch circuit configured to latch the data signals in synchronization with the latch clock signals;
a digital-to-analog converter configured to convert the data signal output from the latch circuit to analog image signals based on the grayscale voltages; and
an output buffer configured to output the analog image signals as the data voltage signals.

12. A display device comprising:
a display panel comprising a plurality of data lines, a plurality of gate lines, and a plurality of pixel each being connected to a corresponding data line among the data lines and a corresponding gate line among the gate lines;
a timing controller configured to receive control signals, image signals, and metadata and output a first driving control signal, a second driving control signal, a reference voltage selection signal, and an image data signal, wherein the reference voltage selection signal is generated according to an electro-optical transfer function (EOTF), a brightness mapping operation, and a gamut mapping operation;
a grayscale voltage generator configured to select a plurality of reference voltages in response to the reference voltage selection signal and generate grayscale voltages based on the selected reference voltages;
a data driving circuit configured to convert the image data signal to data voltage signals based on the first driving control signal and the grayscale voltages and provide the data voltage signals to the data lines; and a gate driving circuit configured to drive the gate lines in response to the second driving control signal, wherein the timing controller parses the metadata and output the reference voltage selection signal based on the parsed metadata.

13. The display device of claim 12, wherein the timing controller comprises:

a meta-data parsing circuit configured to parse the metadata and output the parsed metadata;

an image analyzing and data processing circuit configured to analyze the image signals based on the parsed metadata and output a parameter and data signals; and a reference voltage selector configured to output the reference voltage selection signal based on the parameter and the parsed metadata.

14. The display device of claim 13, wherein the reference voltage selector comprises:

an electro-optical transfer function (EOTF) circuit configured to calculate an EOTF based on the parsed metadata and output a first result value;

a tone mapping unit configured to execute a brightness mapping operation based on the parsed metadata and the parameter and output a second result value;

a gamut mapping unit configured to execute a gamut mapping operation based on the parsed metadata and output a third result value; and a reference voltage selector configured to output the reference voltage selection signal based on the first, second, and third result values.

15. The display device of claim 12, wherein the grayscale voltage generator comprises:

a reference voltage generator configured to generate a plurality of voltages;

a selection circuit configured to output plural voltages corresponding to the reference voltage selection signal among the voltages as the reference voltages; and a voltage generator configured to generate the grayscale voltages based on the reference voltages.

16. The display device of claim 13, wherein the data driving circuit comprises:

a shift register configured to output latch clock signals in synchronization with a clock signal;

a latch circuit configured to latch the data signals in synchronization with the latch clock signals;

a digital-to-analog converter configured to convert the data signals output from the latch circuit to analog image signals based on the grayscale voltages; and an output buffer configured to output the analog image signals as the data voltage signals.

* * * * *